United States Patent [19]
Heber

[11] Patent Number: 5,125,571
[45] Date of Patent: Jun. 30, 1992

[54] VARIABLE SPEED CONTROL OF LIVESTOCK VENTILATION FANS USING DISCRETE FEEDBACK OF MOTOR SPEED

[75] Inventor: Albert J. Heber, Manhattan, Kans.

[73] Assignee: Kansas State University Research Foundation, Manhattan, Kans.

[21] Appl. No.: 526,015

[22] Filed: May 21, 1990

[51] Int. Cl.⁵ .................................... G05D 23/13
[52] U.S. Cl. ......................... 236/49.3; 454/343; 454/239
[58] Field of Search ............ 98/42.04, 421, 33.1, 98/42.05; 236/49.3

[56] References Cited

U.S. PATENT DOCUMENTS

| | | | |
|---|---|---|---|
| 2,300,418 | 11/1942 | Hall | 98/42.04 X |
| 2,552,966 | 5/1951 | Harp | 236/49.3 |
| 2,586,992 | 2/1952 | Rapuano | 236/49.3 |
| 2,750,868 | 6/1956 | Mieczkowski et al. | 98/42.04 X |
| 4,136,822 | 1/1979 | Felter | 98/42.04 X |
| 4,250,868 | 2/1981 | Frye | 98/42.04 X |
| 4,602,739 | 7/1986 | Sutton, Jr. | 236/49.3 |
| 4,640,668 | 2/1987 | Yang | 417/354 |
| 4,734,012 | 3/1988 | Dob et al. | 236/49.3 |
| 4,752,210 | 6/1988 | Trent | 126/116 A |
| 4,877,183 | 10/1989 | Matsuda et al. | 98/42.04 |

Primary Examiner—Albert J. Makay
Assistant Examiner—William C. Doerrler
Attorney, Agent, or Firm—Hovey, Williams, Timmons & Collins

[57] ABSTRACT

A ventilation assembly (10) for buildings (12) such as livestock barns economically and reliably prevents fan motor operation below the minimum speed required for removal of excess moisture and harmful pollutants from a ventilated building and for adequate motor cooling and lubrication. A preferred embodiment includes a fan unit (14) having a fan (18) motor (20), and a speed-responsive centrifugal switch (22), and also includes a speed control unit (16) having a temperature-responsive speed controller (24) and time delay override relay (28). In operation, the centrifugal switch (22) activates the override relay (28) if the motor (20) drops below a predetermined speed for bypassing the speed controller (24) and impose direct line voltage on motor (20) in order to increase its speed to its maximum for a predetermined time as determined by the time delay setting of the relay (28).

16 Claims, 5 Drawing Sheets

VARIABLE SPEED CONTROL OF LIVESTOCK VENTILATION FANS USING DISCRETE FEEDBACK OF MOTOR SPEED

BACKGROUND OF THE INVENTION

1. Field of the Invention

The present invention relates to a ventilation assembly using a variable speed motor which economically and reliably prevents fan motor operation below the minimum speed required for removal of excessive moisture and harmful pollutants from a ventilated building, and for adequate motor cooling and lubrication. More particularly, the invention relates to a ventilation assembly in which a temperature responsive speed controller automatically varies the speed of the motor in accordance with the building temperature and in which motor includes a centrifugal switch for activating an override relay in order to bypass the speed control to boost the motor speed to maximum for a predetermined time when motor speed drops below a predetermined minimum speed.

2. Description of the Prior Art

In typical livestock confinement buildings such as chicken houses, hog barns, and the like, temperature is controlled by means of a plurality of temperature responsive exhaust ventilation assemblies mounted to respective screened and louvered windows. Each ventilation assembly typically includes a motor coupled to a fan and a temperature responsive device of some sort such as a thermostat or temperature probe.

If thermostat control is used, a temperature rise above the set point causes the thermostat contacts close in order to energize the fan motor. This in turn exhausts air from the building which induces the entry of fresh air through intake vents in order to lower the temperature of the building. When the building temperature falls below the set point, the thermostat stops the motor. On and off operation of a motor typically results in a wider temperature band width than desired. Furthermore, on/off operation of the fan produces surges in air flow with potentially wide temperature swings especially if the outside air is substantially cooler than the building material. This can be particularly detrimental to temperature sensitive animals such as chickens. It can also result in higher energy costs due to increased cycling of heaters.

More sophisticated ventilation assemblies include a variable speed motor operably coupled with a speed controller which in turn is coupled with a temperature probe. In operation, the controller varies the speed of the motor in accordance with the temperature sensed by the probe. This allows a tighter control of temperature and results in a narrower temperature band width.

A typical prior art speed control varies the motor speed by varying the input voltage to the motor. In order to prevent the motor from running at a speed below the minimum required for adequate motor cooling and bearing lubrication, and for removing building moisture and pollutants, such speed controllers are designed to provide a minimum voltage level, such as 50%, to prevent the motor from operating below the minimum allowed speed, such as 20%. A problem develops, however, if the fan assembly is operating against a head wind or the louvers and screens become blocked with dust and dirt. When such occurs, the motor speed may drop below the minimum level even though the controller is providing sufficient voltage to operate the motor above the minimum level under normal conditions. This in turn may lead to motor burn out or, at least, shorten its expected operating life. It may also lead to serious under-ventilation of the building.

SUMMARY OF THE INVENTION

The present invention solves the prior art problems outlined above. In particular, the ventilation assembly hereof discretely determines whether motor speed is below a predetermined minimum and if so, boosts motor speed to a higher level for a predetermined time.

The preferred ventilation assembly includes a fan unit having a motor-operable fan for inducing air flow, a variable speed motor coupled with the fan, and a switching device discretely activatable in response to the speed of the motor being below a predetermined minimum speed. The preferred assembly also includes a speed control unit having a speed controller for selectively varying the speed of the motor and an override device responsive to activation of the switching device for increasing motor speed to a predetermined higher level for a predetermined time.

In preferred forms, discrete motor speed is indicated by means of a centrifugal switch, the preferred override device includes a time delay relay for bypassing the speed controller, and the predetermined higher speed is maximum motor speed.

In another embodiment, a microprocessor circuit is used along with an operating program for increasing motor speed in increments in order to prevent surges in air flow which may lead to wide-band temperature swings.

BRIEF DESCRIPTION OF THE DRAWING FIGURES

DETAILED DESCRIPTION OF THE PREFERRED EMBODIMENTS

Figure 1:
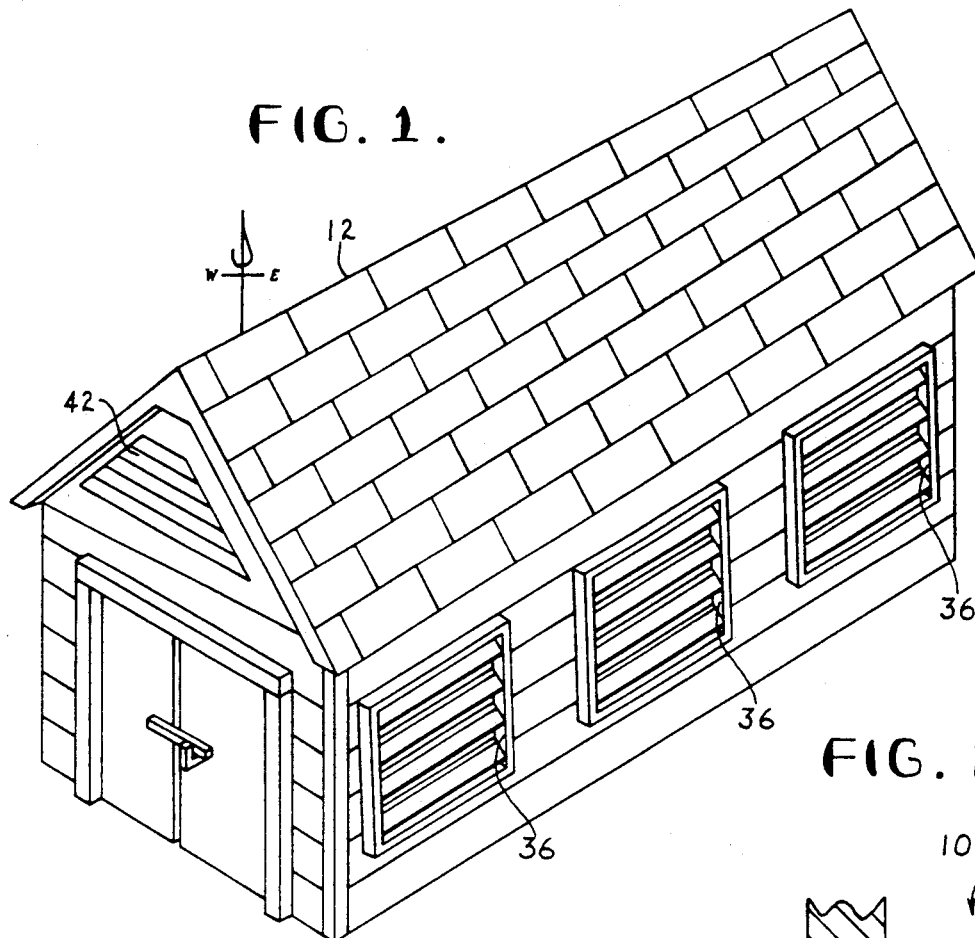
FIG. 1 is a perspective view illustrating a building to be ventilated by means of the present invention.
Figure 2:
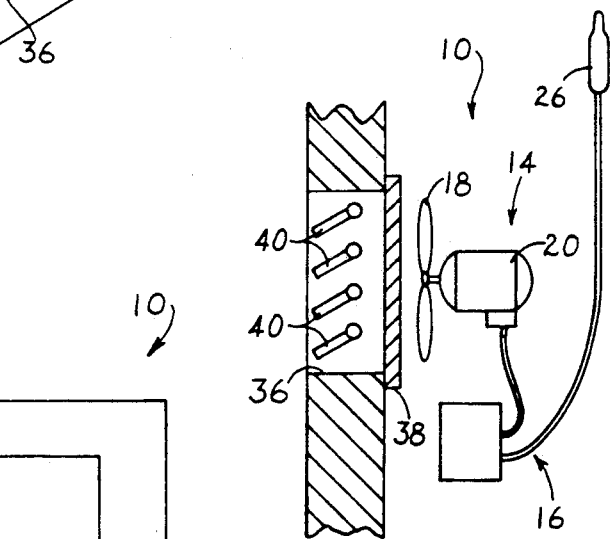
FIG. 2 is a schematic representation of the preferred ventilation assembly mounted adjacent the interior of a window of the building illustrated in FIG. 1.
Figure 3:
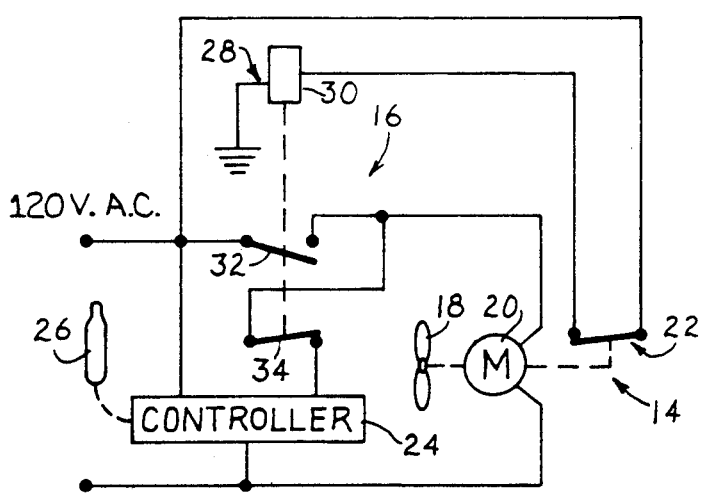
FIG. 3 is an electrical schematic diagram illustrating the preferred control circuit of the present invention.

Referring to the drawing figures, FIGS. 2 and 3 illustrate preferred ventilation 10 for ventilating building 12 illustrated in FIG. 1 which may take the form of a livestock barn or the like. Ventilation assembly 10 broadly includes fan unit 14 and motor speed control unit 16.

Fan unit 14 includes a conventional propeller type fan 18, conventional, variable-speed motor 20 (120/240 V.A.C.) mechanically coupled to fan 18, and conventional, normally closed, centrifugal switch 22 incorporated in the housing of motor 20 and designed to open when motor 20 is above the predetermined minimum speed and to close when it is below that level. Motor 20 includes a main winding and auxiliary winding which enables the output speed to vary in accordance with the input supply voltage imposed thereon.

Motor speed control unit 16 includes conventional speed controller 24 which is preferably model AV-11 available from Osborne Industries, Inc. of Osborne, Kans., temperature probe 26 typically in the form of a thermistor coupled to controller 24, and override relay 28. In the preferred embodiment, override relay 28 is a conventional electro-mechanical relay configured for an adjustable time delay on drop out such as an AGASTAT brand relay. Override relay 28 includes a relay coil 30, normally open contact 32 and normally closed contact 34. When energized, relay coil 30 operates to change the state of contacts 32 and 34. After coil 30 is deenergized, contacts 32 and 34 remain in their changed state or activated position for a predetermined time delay and then revert to the de-activated position as shown in FIG. 3.

As mentioned above, FIG. 1 illustrates the preferred environment of use of ventilation assembly 10 in connection with building 12 such as a chicken house, hog barn, or the like. Ventilation assembly 10 is mounted adjacent windows 36 in position to exhaust an air flow therethrough by way of screen 38 and pivotally mounted louvers 40. A plurality of ventilation assemblies 10 are typically provided for respective windows to induce exhaust ventilation therethrough and to induce ambient air intake through intake vents 42 (only one of which is shown in FIG. 1).

In operation, speed controller 24 receives operating power from a conventional source thereof which is preferably single phase 120/240 V.A.C. On initial power-up, centrifugal switch 22 is normally closed which provides a circuit from the 120 V.A.C. source to one side of coil 30 to ground thereby energizing coil 30. This in turn closes contact 32 and opens contact 34. Line voltage is supplied directly through the now closed contact 32 to motor 20 thereby energizing motor 20 for maximum speed. Contact 34 is open thereby preventing variable voltage supply from controller 24 to motor 20.

As motor 20 increases its speed, centrifugal switch 22 opens and deenergizes relay coil 30. Contact 32 remains closed and contact 34 remains open, however, because of the predetermined time delay, for example one minute. With contact 32 closed, motor 20 continues to increase its speed to its maximum as determined by its design and line voltage supplied thereto.

After relay 28 times out, contacts 32 and 34 return to their de-activated position as shown in FIG. 3 which allows controller 24 to supply operating power to motor 20 by way of contact 34. In normal operation, controller 24 supplies output voltage to motor 20 as a function of the temperature input from probe 26. Thus, controller 24 is free to increase or decrease the speed of motor 20 in accordance with the sensed temperature. For example, as the sensed temperature rises the output voltage of controller 24 correspondedly increases which increases the speed of motor 20 and fan 18 in order to induce a greater air flow through windows 36.

As the temperature falls, controller 24 decreases its output voltage and thereby decreases the speed of motor 20. Controller 24 is typically designed so that it will not reduce the output voltage below a predetermined minimum, such as 20% of full range voltage, which is selected to maintain the speed of motor 20 above the allowable minimum for adequate cold weather building ventilation, for adequate motor cooling and bearing lubrication, and for providing enough centrifugal force to keep switch 22 in the open or deactivated position.

In the event screen 38 becomes covered with dust or dirt, or a head wind is blowing against windows 36, the speed of fan unit 14 may slow to a level below the allowable minimum even though controller 24 is providing its design voltage. If such occurs, centrifugal switch 22 closes which energizes coil 28 and changes the state of contacts 32 and 34 to impose voltage on motor 20 which increases its speed to the maximum. When the speed of the motor 20 rises above the predetermined minimum, centrifugal switch 22 opens. As discussed above, however, contact 32 and 34 do not change state until the predetermined time delay has occurred. At the end of the time delay, contacts 32 and 34 again change state to their respective deactivated positions as shown in FIG. 3 which allows controller 24 to resume control of motor 20.

If the slow down of fan unit 14 is caused by a head wind, and the head wind has decreased sufficiently, controller 24 will be able to control the speed of motor 20 normally even at the minimum level without risk of over heating the motor and of underventilating the building. In the event, however, that the slow down is due to dust or dirt on screen 38 or any other obstruction of 36, the speed of motor 20 will again drop below the minimum level, centrifugal switch 22 will close, and override relay 28 will again cause motor 22 to increase to its maximum speed for the predetermined time delay. This cycle will repeat until the obstruction is cleared. This cycling has relatively little effect on the life expectancy of the motor because no starting surge currents are imposed since the motor is already running when override relay 38 activates.

The preferred embodiment of the present invention uses relatively inexpensive yet reliable centrifugal switch 22 and override relay 28. This enables a very economical solution to the problem of variable speed motors dropping below their minimum allowable level while providing very high reliability due to the mechanical and electrical simplicity. This in turn avoids the need for more expensive speed transducers such as Hall effect transducers, or the like coupled with the motor or fan shaft, and avoids the need for a sophisticated signal receiving circuitry in controller 24.

Figure 4:
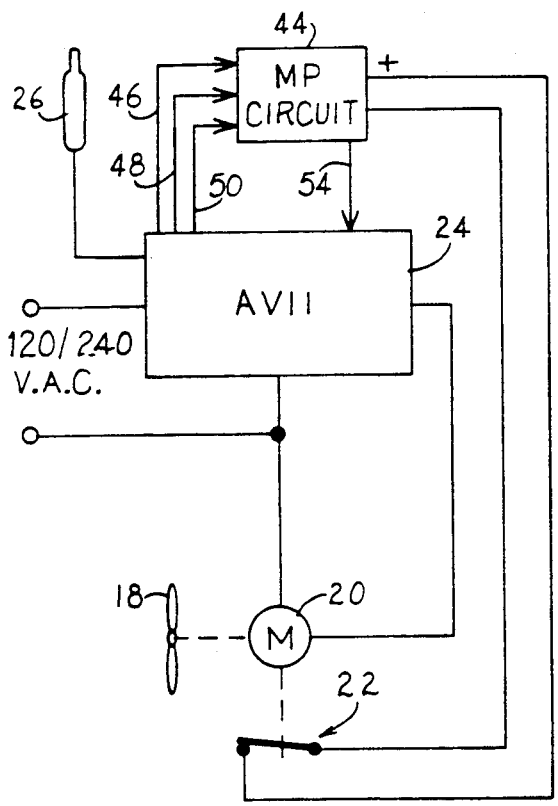
FIG. 4 is a schematic representation of another embodiment of the preferred fan control illustrating the preferred controller coupled with a microprocessor circuit.
Figure 5:
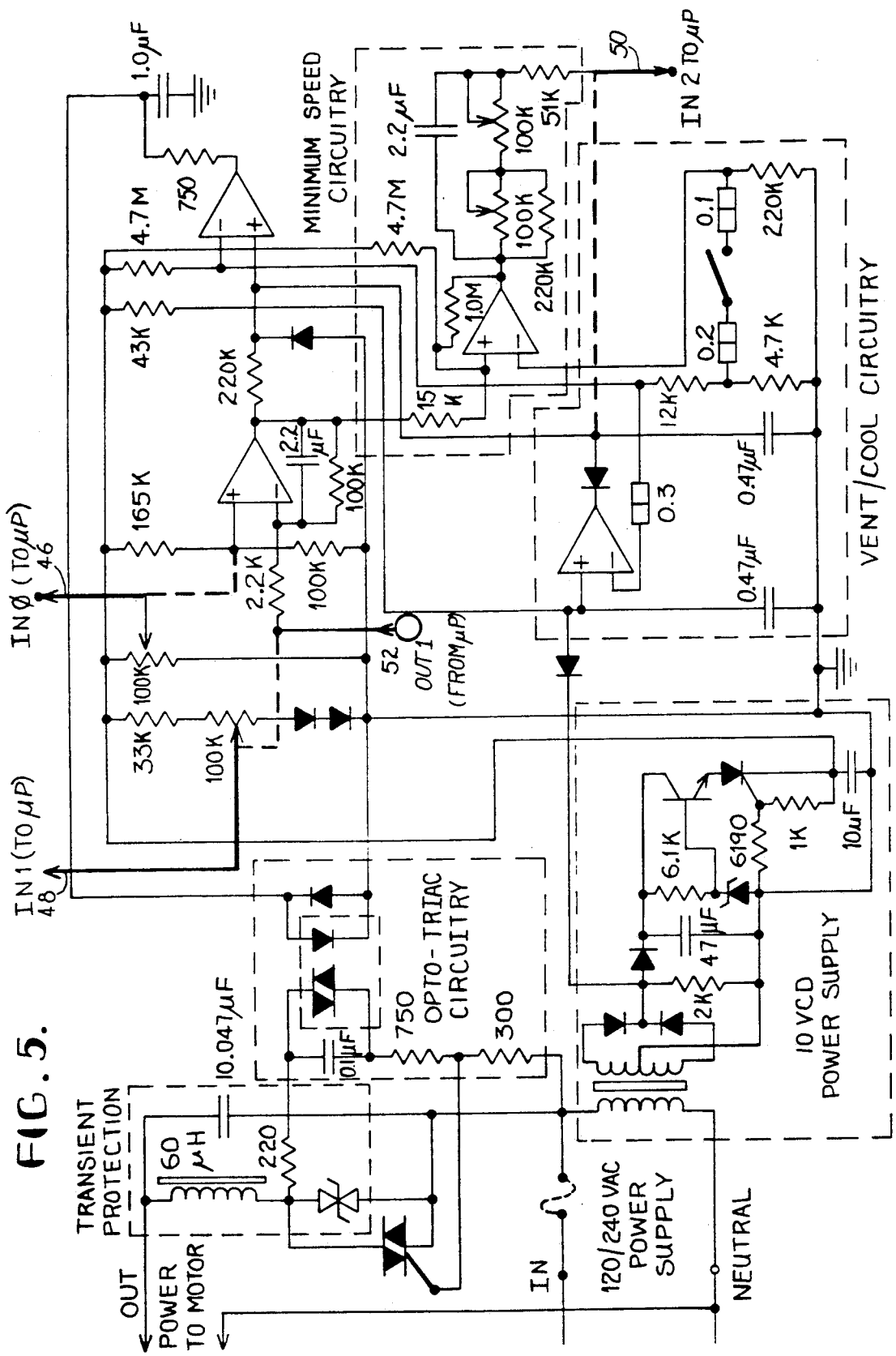
FIG. 5 is an electrical schematic diagram of modifications of the fan controller of FIG. 4.

FIGS. 4-8 illustrate a second embodiment of the invention which implements motor speed increases in relatively small increments in order to prevent sudden jumps to maximum motor speed when centrifugal switch 22 closes. Referring initially to FIG. 4, microprocessor circuit 44 is coupled with controller 24 and replaces override relay 28. In order to accomplish this, the off-the-shelf circuitry of controller 24 is modified as shown in FIG. 5. In this drawing figure, the bold lines indicate additional lines including input lines 46 (IN0), 48 (IN1), and 50 (IN2) and output line 52 (OUT1), all connected as shown.

Figure 8:
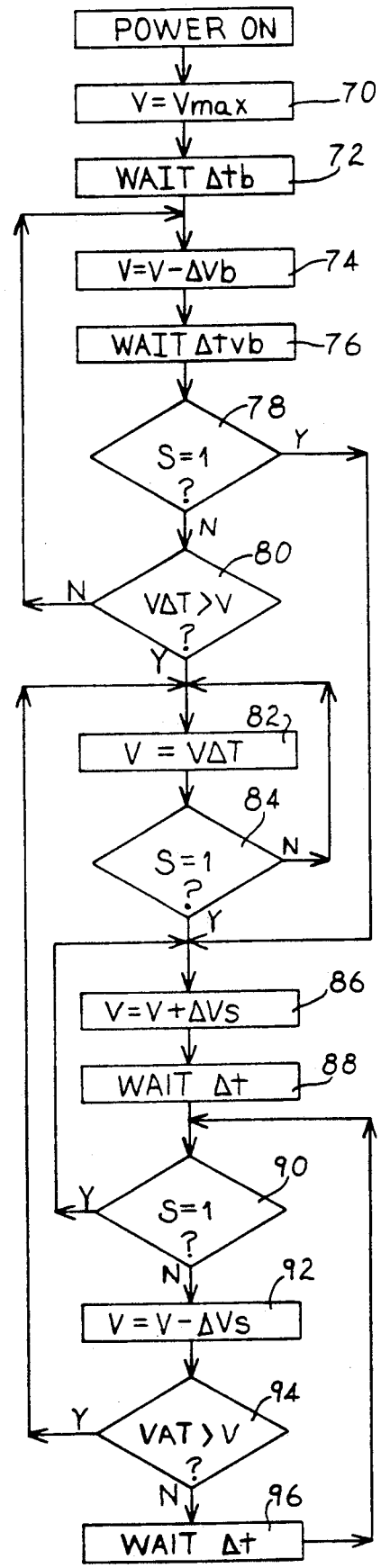
FIG. 8 is a computer program flowchart for use in operating the microprocessor of FIG. 6.
Figure 6:
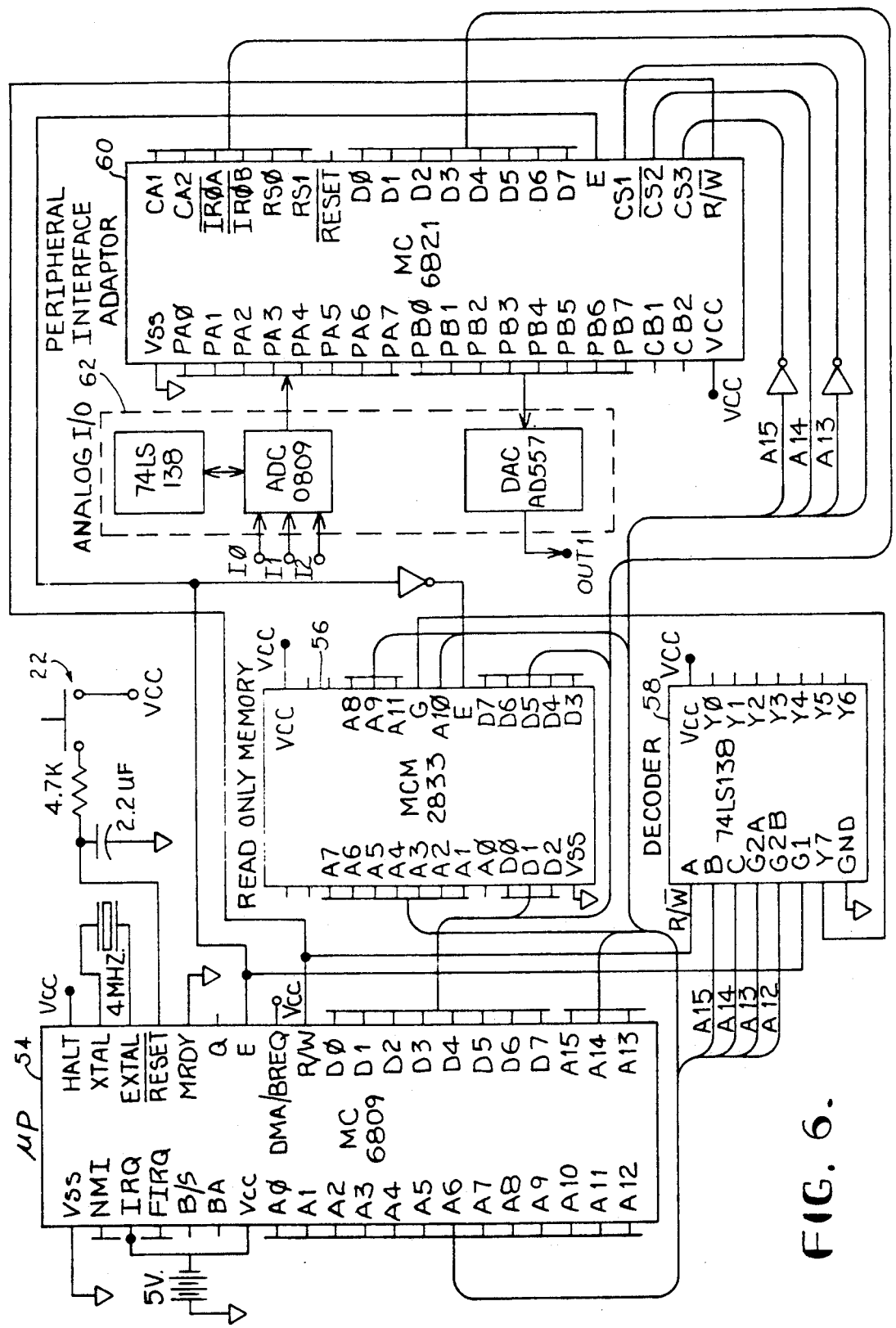
FIG. 6 is an electrical schematic diagram of the microprocessor circuit of FIG. 4.

FIG. 6 is an electrical schematic diagram illustrating microprocessor circuit 44 which includes microprocessor 54 (MC8609), read-only-memory (ROM) 56 (MCM.2833), address decoder 58 (74LS138) peripheral interface adapter 60 (MC6821) and analog input/output (I/O) circuit 62. These components are conventional connected as shown in FIG. 6. ROM 56 stores the operating program as illustrated in FIG. 8 and explained further hereinbelow for operating microprocessor 54. I/O circuit 62 receives the inputs IN0, IN1 and IN2 from modified controller 24 and provides output OUT1 thereto. As shown in FIG. 6, centrifugal switch 22 is connected to microprocessor 54.

Figure 7:
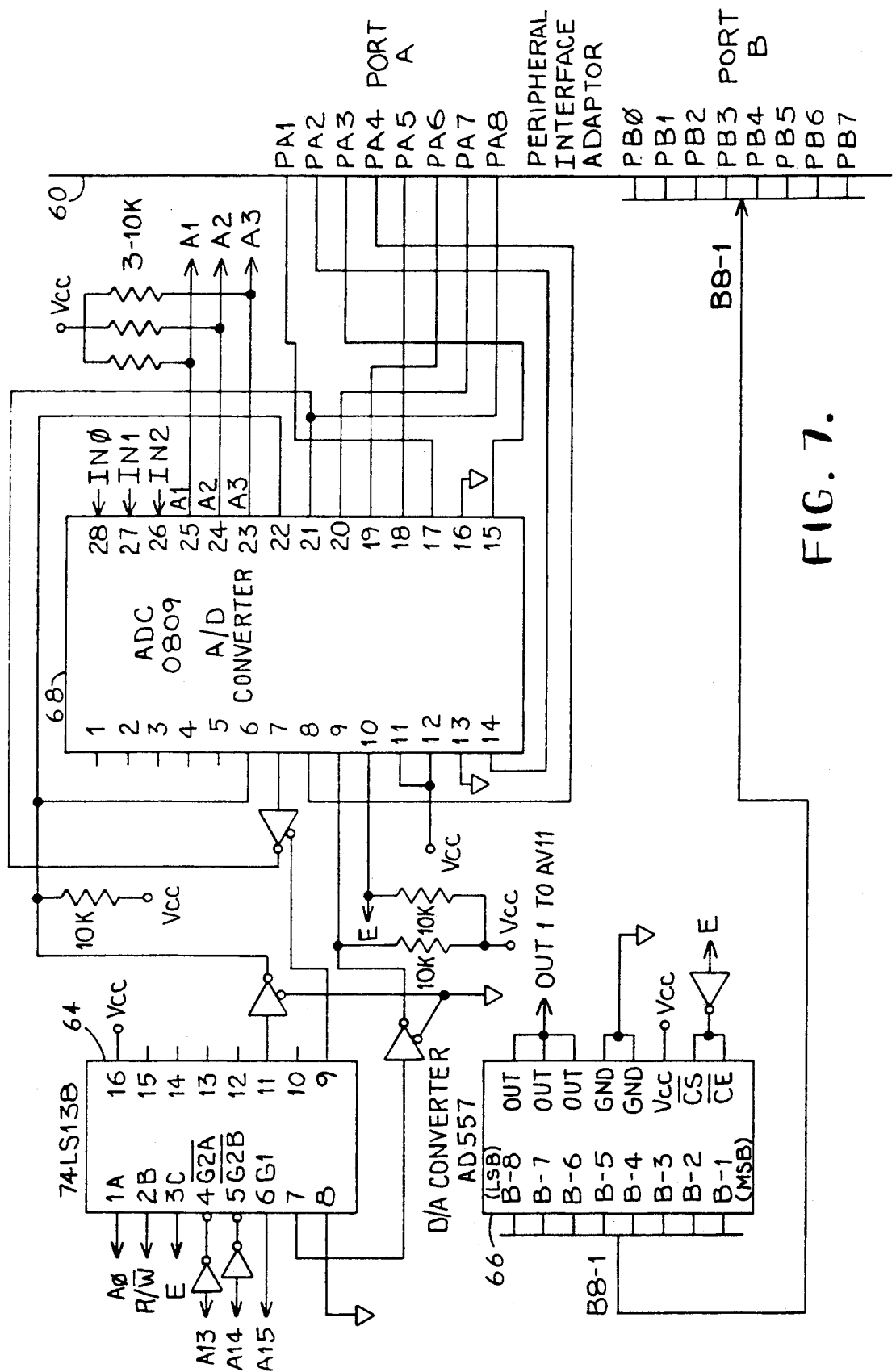
FIG. 7 is an electrical schematic diagram of the analog input/output connections of FIG. 6.

FIG. 7 is an electrical schematic diagram further illustrating the components of I/O circuit 62. These components include decoder 64 (74LS138), digital-to-analog-converter (DAC) 66 (AD557), and analog-to-digital-converter (ADC) 68 (ADC0809). Components 64-68 are interconnected with peripheral interface adaptor 60 and with microprocessor 54 as illustrated in FIG. 7.

FIG. 8 is a computer program flowchart illustrating the programs stored in ROM 56 for operating microprocessor 54 and by way of lines 46-52 controlling the operation of controller 24. The program enters at power-on and proceeds to step 70 which causes the output voltage imposed on motor 20 to be line voltage in order to bring motor speed up to its maximum during start-up. The program then proceeds to step 72 in order to wait for a predetermined time such as two seconds to allow the motor to come up to full speed.

The program then moves to step 74 which decrements the voltage impressed on motor 22 by an incremental amount such as 5% of full range voltage. The program then moves to step 76 in which the program waits for a predetermined time limit to allow time for the motor to respond to the voltage change imposed in step 74.

After step 76, the program moves to step 78 which asks whether centrifugal switch 22 is closed indicating that the motor is below its minimum-allowed speed. If no, the program moves to step 80 which asks whether the setpoint motor voltage as a function of temperature probe 26 is above the currently imposed voltage to motor 20. That is to say, controller 24 determines what the output voltage should be to motor 20 as a function of the temperature as sensed by probe 26. If the probe-determined, setpoint voltage is not greater than the actual voltage being imposed on motor 20, then this indicates that the motor voltage is too high, then the program loops back to step 74 to decrement the motor voltage another incremental amount.

When the voltage imposed on motor 20 matches the setpoint voltage the answer in 80 is yes, this marks the end of the start-up portion of the program, and the program moves to step 82. In this step, the output voltage to motor 20 is set equal to the setpoint voltage and the program moves to step 84.

Step 84 asks whether centrifugal switch 22 is closed. If not, the program continues to loop through steps 82 and 84 as the normal operating mode. Each time the program passes through step 82, it sets the motor voltage equal to the setpoint voltage and in this way adapts to changing temperature conditions as sensed by probe 26.

As discussed above in connection with the first embodiment, a head wind against propeller 18 or blocked louvers or screens may result in the speed of motor 20 falling below the minimum allowable speed in which case centrifugal switch 22 opens. In the first embodiment, when switch 22 opens, line voltage is imposed on motor 20 which results in full speed operation which may result in ventilation surges and a sudden drop in building temperature, especially if the outside air is substantially cooler than the building material. Accordingly, if the answer in step 84 is yes, indicating that switch 22 is open, the program moves to step 86 which increments the motor voltage by a relatively small amount instead of causing a jump to full motor speed.

In step 88, the program pauses to allow motor 20 to respond to the new voltage and then moves to step 90 which asks whether switch 22 is still closed. If yes, the program loops back to step 86 and again increments motor voltage until switch 22 opens.

When switch 22 opens, the answer in step 90 is no and the program advances to step 92 which decrements the motor voltage whereupon the program moves to step 94 which asks whether the setpoint voltage is above the actual voltage on motor 20. If yes, the program loops back to step 82.

If the answer to step 94 is no indicating that the setpoint voltage is still less than the actual voltage, the program moves to step 96 and waits to allow the motor speed to stabilize and then loops back to step 90 to again check whether switch 22 is closed. If no, the motor voltage is again decremented in step 92 and the program in step 94 again checks to see whether setpoint voltage is greater than the actual voltage. If yes, the program loops back to step 82 and again enters the main operating loop. In this way, if the closing of switch 22 is a temporary phenomenon which eventually clears itself, the program eventually reenters the main operating loop of steps 82 and 84. If the condition is not temporary, then the program remains confined to step 86-96.

The present invention encompasses many variations in the preferred embodiments described herein. For example, a solid state relay could be equivalently substituted for the preferred electromechanical relay 28. Additionally, the computer program of the second embodiment which is preferably implemented in software could equivalently be achieved in hardware using a custom-designed semiconductor chip, for example.

Having thus described the preferred embodiments of the present invention, the following is claimed as new and desired to be secured by Letters Patent:

1. A method of ventilating a livestock building for ensuring a minimum level of ventilation, the building having a ventilation opening, said method comprising the steps of:

coupling a fan unit adjacent the ventilation opening for inducing building ventilation therethrough, said fan unit including a motor-operable fan for inducing said ventilating and a variable speed motor coupled with said fan for operation thereof, said motor being responsive to a variable input for varying the speed of said motor and fan in correspondence with said input;

sensing the temperature of the building;

varying the speed of said motor in correlation with said temperature by varying said variable input;

maintaining said variable input above a predetermined minimum input for normally maintaining said fan and motor speed above a predetermined minimum speed corresponding to a desired minimum level of building ventilation, said fan and motor speed being subject to a drop in speed below said minimum speed while receiving said minimum input upon the occurrence of resistance to air flow through the ventilation opening;

equipping said fan unit means with a speed-activatable, mechanically operable switch discretely activatable in response to the speed of one of said fan and motor being below said minimum speed corresponding to said minimum level of building ventilation;

sensing activation of said switch; and increasing said variable input and thereby the speed of said motor by a predetermined amount in response to said activation of said switch for overcoming said resistance to air flow in order to increase said building ventilation by a corresponding amount above said minimum level of ventilation thereby ensuring a minimum level of ventilation for said building.

2. The method as set forth in claim 1, the building including a ventilation inlet, said coupling step including the step of coupling said fan unit means adjacent the ventilation opening for producing outward air flow therethrough in order to induce inward air flow through said ventilation inlet.

3. The method as set forth in claim 1, said varying step including the step of varying the speed of said motor in correspondence with said temperature so that an increase in said temperature results in an increase in motor speed, and so that a decrease in said temperature results in a decrease in motor speed.

4. The method as set forth in claim 3, said motor being responsive to variations in voltage for correspondingly varying the speed of said motor, said varying step including the step of varying said voltage in correspondence with said temperature.

5. The method as set forth in claim 4, further including the step of preventing said voltage from decreasing to a level below a predetermined minimum voltage.

6. The method as set forth in claim 1, said equipping step including the step of equipping said motor with a speed-activatable, centrifugal switch activatable for opening and closing in response to the speed of said motor.

7. The method as set forth in claim 1, said increasing step including the step of increasing the speed of said motor to maximum motor speed for a predetermined amount of time in response to activation of said switch.

8. The method as set forth in claim 1, said switch being deactivated above said minimum speed, said method further including the steps of sensing for deactivation of said switch and increasing the speed of said motor by successive ones of said predetermined amount until deactivation of said switch is sensed.

9. A ventilation apparatus for ventilating a building for ensuring a minimum level of ventilation thereof, the building having a ventilation opening, said apparatus comprising:

fan unit means, including means for coupling adjacent to the ventilation opening, for inducing building ventilation through the opening, said fan unit means including a motor-operable fan for inducing said ventilation and a variable speed motor coupled with said fan for operation thereof, said motor being responsive to a variable input for varying the speed of said motor and fan in correspondence with said input;

temperature sensing means for sensing the temperature of the building;

speed varying means, including means for operably coupling with said temperature sensing means and said motor for responding to said building temperature and for varying the speed of said motor in correlation with means for maintaining said variable input above a predetermined minimum input for normally maintaining said fan and motor speed above a predetermined minimum speed corresponding to a desired minimum level of building ventilation, said fan and motor speed being subject to a drop in speed below said minimum speed while receiving said minimum input upon the occurrence of resistance to air flow through the ventilation opening; and a speed-activatable, mechanically operable switch including means for operably coupling with said fan unit means, said switch including means for discrete activation thereof in response to the speed of one of said fan and motor being below a predetermined minimum speed corresponding to a predetermined minimum level of building ventilation, said speed varying means including means for sensing activation of said switch and for increasing the speed of said motor by a predetermined amount in response to activation of said switch for overcoming said resistance to air flow thereby ensuring a minimum level of ventilation for the building.

10. The apparatus as set forth in claim 9, said speed varying means including means for varying the speed of said motor in correspondence with said temperature so that an increase in said temperature results in an increase in motor speed, and so that a decrease in said temperature results in a decrease in motor speed.

11. The apparatus as set forth in claim 10, said motor being responsive to variations in voltage for correspondingly varying the speed of said motor, said speed varying means including means for varying said voltage in correspondence with said temperature.

12. The method as set forth in claim 11, said speed varying means including means for preventing said voltage from decreasing to a level below a predetermined minimum voltage.

13. The apparatus as set forth in claim 9, said switch being a centrifugal switch activatable for opening and closing in response to the speed of said motor.

14. The apparatus as set forth in claim 9, said speed varying means including means for increasing the speed of said motor to maximum motor speed for a predetermined amount of time in response to activation of said switch.

15. The apparatus as set forth in claim 9, said switch being deactivated above said minimum speed, said speed varying means including means for sensing deactivation of said switch and for increasing the speed of said motor by successive ones of said predetermined amount until deactivation of said switch is sensed.

16. The apparatus as set forth in claim 9, said speed varying means including a microprocessor operable for varying the speed of said motor by said predetermined amount.

* * * * *